(12) United States Patent
deCarmo et al.

(10) Patent No.: US 6,181,339 B1
(45) Date of Patent: *Jan. 30, 2001

(54) METHOD AND SYSTEM FOR DETERMING A CORRECTLY SELECTED BUTTON VIA MOTION-DETECTING INPUT DEVICES IN DVD CONTENT WITH OVERLAPPING BUTTONS

(75) Inventors: Linden A. deCarmo; Jan Christensen, both of Plantation, FL (US)

(73) Assignee: Oak Technology, Inc., Sunnyvale, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/122,811

(22) Filed: Jul. 27, 1998

(51) Int. Cl.$^7$ ........................................ G06F 3/14
(52) U.S. Cl. ............................................. 345/348
(58) Field of Search ..................... 345/339, 343, 345/344, 348, 354, 357, 326

(56) References Cited

U.S. PATENT DOCUMENTS

| | | | |
|---|---|---|---|
| 5,564,004 | * 10/1996 | Grossman et al. | 345/348 |
| 5,740,390 | * 4/1998 | Pickover et al. | 345/348 |
| 5,745,715 | * 4/1998 | Pickover et al. | 345/348 |
| 5,754,177 | * 5/1998 | Hama et al. | 345/339 |
| 5,754,179 | * 5/1998 | Hocker et al. | 345/348 |
| 5,757,358 | * 5/1998 | Osga | 345/146 |
| 5,760,774 | * 6/1998 | Grossman et al. | 345/348 |
| 5,808,601 | * 9/1998 | Leah et al. | 345/145 |
| 5,852,440 | * 12/1998 | Grossman et al. | 345/348 |
| 6,031,531 | * 2/2000 | Kimble | 345/348 |

* cited by examiner

Primary Examiner—Crescelle N. dela Torre
(74) Attorney, Agent, or Firm—Kudirka & Jobse, LLP

(57) ABSTRACT

A method and system are disclosed for allowing selection of an icon most logically desired by the user in a graphic user interface when multiple icons are overlapping and the pointing device coordinates would force a given selection not desired by the user. A logical icon selector is provided that is coupled to the pointing device and provides a logic for selecting the desired icon based on proximity of the pointing device icon to the desired icon. Based on a calculation of the location of the overlapping icons to the pointing device icon, the icon having the closest proximity to the pointing device is selected.

12 Claims, 4 Drawing Sheets

METHOD AND SYSTEM FOR DETERMING A CORRECTLY SELECTED BUTTON VIA MOTION-DETECTING INPUT DEVICES IN DVD CONTENT WITH OVERLAPPING BUTTONS

FIELD OF THE INVENTION

This invention relates generally to improvements in digital versatile disc systems and, more particularly, to an improved user interface therein where user-selected buttons are accessed via closest proximity when selecting from overlapping buttons.

BACKGROUND OF THE INVENTION

Digital versatile discs (DVDs) are information storage devices used for storing prerecorded audio information, movies and computer software. The storage mechanism used in DVDs closely resembles that used in compact discs (CDs). DVD players also use the same laser technology as CD players. Briefly, both DVDs and CDs store information as a pattern of pits formed in a metallic substrate. The pit patterns form digital words and can be read by shining a laser beam on the disc surface and detecting the reflected beam. The information storage capacity of a typical DVD, however, is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies will soon be available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information, hereinafter called DVD-VIDEO discs, may use various known information compression algorithms, such as MPEG-2 for video compression/decompression. A DVD may also include high fidelity sound as well. In addition, a DVD may also store uncompressed linear pulse code modulated data streams which may have varying sample rates. Still other DVD versions, hereinafter called DVD-ROM discs, can store digital data for computer use, and the data may also be compressed on these discs.

Although DVD-ROM and DVD-VIDEO discs share compression algorithms, the data format on DVD-VIDEO discs is significantly different than the data format found on DVD-ROM discs. One important difference is that the data content on DVD-ROM is platform-specific, while DVD-VIDEO discs operate with a platform independent navigation engine for playing interactive movies. This navigation engine requires that the files on the DVD-VIDEO disc be referenced in a predetermined directory structure.

The specific navigational commands that are recognized by a DVD player are controlled by a device independent language and a set of DVD player parameters which define the current state of the DVD player. The DVD command set, including the aforementioned commands and their definitions, are published in the DVD specification. A copy of the *DVD 1.0 Specification for Read-Only Disc Vol. 3*, including a more detailed description of all DVD commands, may be obtained, for example, from Toshiba Corp., 1—1 Shibaura 1-Chome, Minato-ku, Tokyo 105-01 Japan.

When a user accesses the navigational commands with a pointing device, such as a mouse or trackball icon, the user manipulates the pointing icon to the desired command or button. Once the user has located the desired command, the user clicks on the button with the pointing device to select or activate the command. The user navigators currently available use linear processing to determine the coordinates of each button. The pointing icon typically falls with a range of coordinates to signify that a given button has been selected. Unfortunately, various DVD titles and programs are offering buttons that overlay one another for ease of use and esthetic appeal. Unfortunately, the current navigator systems do not recognize when such buttons lay one on top another and cause confusion to the operator in attempting to select a desired button.

For example, the program may have three buttons that display text of their presence, but lack an outline showing their respective borders. Furthermore, the several buttons may be overlain such that one of the buttons, otherwise visible had it had an active border, is invisible and hidden from the user. The user would not be able to select the desired button. Additionally, once a user moves the pointing icon directly to the desired button, if that button is behind another button in sequence, although visible to the user, and the button is selected, an inappropriate button will be selected instead.

Accordingly, a need exists for a method and system for selecting the most logical button associated with the user's actual placement of the pointing device icon on a group of buttons that overlap one another.

SUMMARY OF THE INVENTION

According to the present invention, a method and system are disclosed for allowing a navigation system to select a button most logically desired by the user when multiple buttons are overlapping and the mouse coordinates would force a given selection not desired by the user. The system is a computer system that automatically selects a desired icon in a graphical user interface where the desired icon is selected from multiple overlapping icons displayed on a video display. The pointing device may be such an item as a mouse, a trackball, or a digitizer tablet, or any other type of pointing device. The pointing device is controlled by the processor and is viewable as an icon on the video display and allows the user to communicate with the graphical user interface. A logical icon selector is provided that is coupled to the pointing device and provides a logical means for selecting the desired icon based on proximity of the pointing device to the icon. This proximity is based on a rigorous calculation of the location of the overlapping icons to the pointing device icon. The icon having the closest proximity to the pointing device will be selected. If the wrong icon is selected, the user then, may back track on the selection and make a new selection.

This system is useful in most computer systems that utilize icons in graphical user interface where several icons may overlap and the icon buttons may be transparent or overlapping such that it is unclear as to which button is actually being selected. As long as the user gets the pointing device icon closest to the button actually desired, then the system will logically select that particular icon as the one desired by the user. In one embodiment, the system is a DVD device that operates under a navigational GUI manipulated by the user.

The system utilizes a method of monitoring location of the icon for the pointing device as moved by the user. The method then detects the proximity and calculates the actual distance from the center of each button to the icon. The method matches compares the distances one to another and selects the one that is closest. This method may also be stored on computer useable program means and utilized by a computer system as the program is loaded to modify the system to perform the operation as detailed in the computer program means.

BRIEF DESCRIPTION OF THE DRAWINGS

The above and other features, objects and advantages of the invention will be better understood by referring to the following detailed description in conjunction with the accompanying drawing in which.

DETAILED DESCRIPTION

Figure 1:
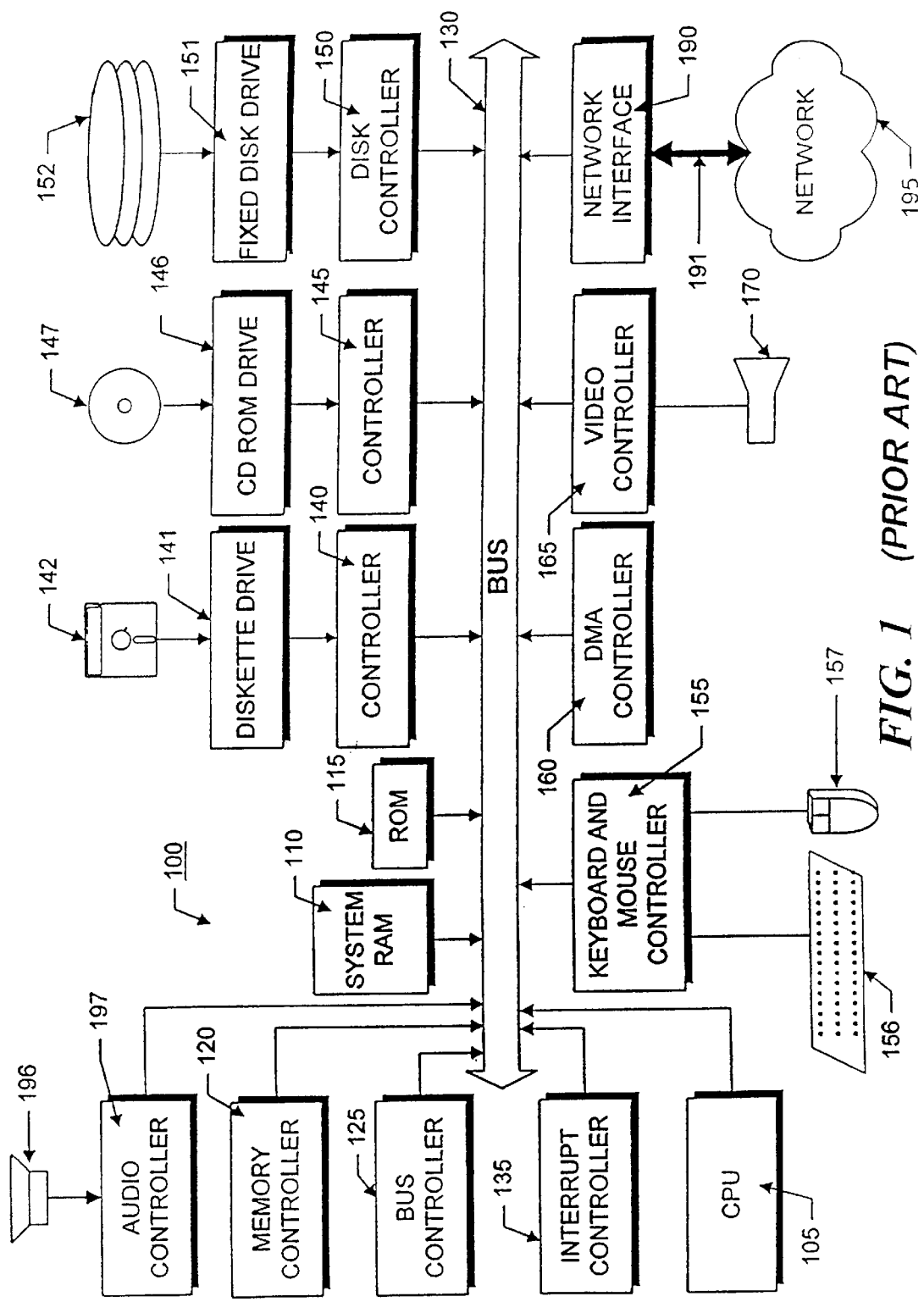
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 130 by a controller 140. Similarly, CD ROM 147 is insertable into CD ROM drive 146 which is, in turn, connected to bus 130 by controller 145. Hard disc 152 is part of a fixed disc drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Boca Raton, Fla. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2, UNIX and DOS, etc. One or more applications, such as Lotus NOTES™, commercially available from Lotus Development Corp., Cambridge, Mass. may also run on the CPU 105. If the operating system is a true multitasking operating system, such as OS/2, multiple applications may execute simultaneously.

Figure 2:
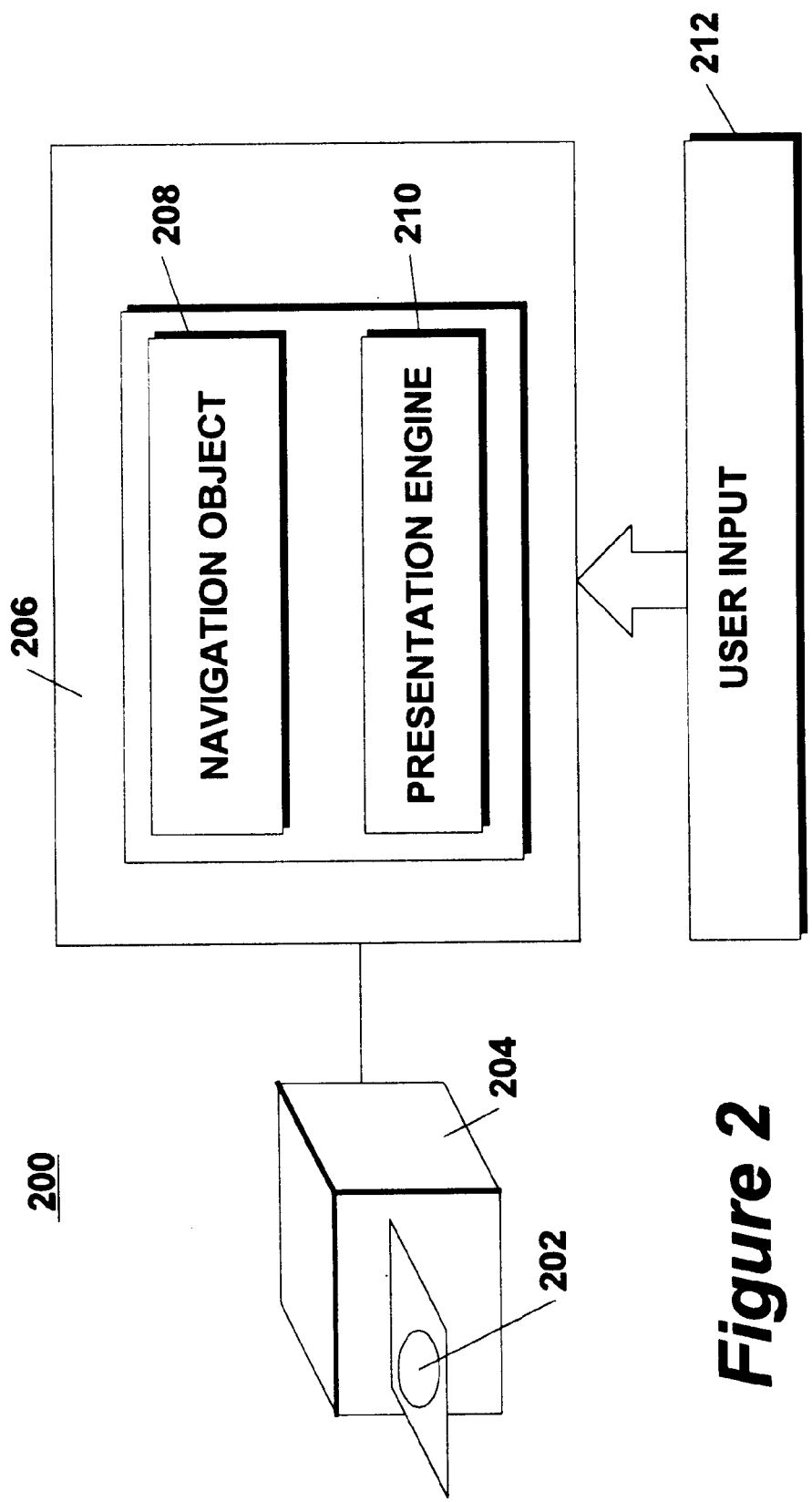
FIG. 2 is a conceptual diagram of the elements comprising an Interactive DVD Browser suitable for use with the present invention.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD source mechanisms such as the internet, digital satellite dishes, etc., may be substituted for the DVD-ROM drive 204. In addition, the DVD-ROM drive 204 may also be a drive suitable for internal mounting in computer 206.

The DVD drive 204 receives a disc 202 containing compressed and encoded information which has been coded in accordance with the DVD 1.0 Specification for Read-Only Disc and disc 202 may contain up to seventeen gigabytes of information. The computer 206 includes a driver, not shown, for enabling the operating system in the computer 206 to control and exchange information with the drive 204. Computer 206 also includes one or more input devices 212 which receive input from a user.

The computer 206 also includes a control and playback program shown schematically in FIG. 2 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression, also known as "Dolby® Digital" decompression. Video information may be compressed using a compression technique known as Moving Picture Experts Group-2 (MPEG-s). The computer 206 also includes an optimizer 214 and a storage unit 216. The storage unit 216 operates as a cache and may take the form of system RAM 110.

In an illustrative embodiment, the software elements of system 200 may be implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs. In a preferred embodiment, the elements of interface system are implemented in the C++ programming language using object-oriented programming techniques. C++ is a compiled language, that is, programs are written in a human-readable script and this script is then provided to another program called a compiler which generates a machine-readable numeric code that can be loaded into, and directly executed by, a computer. As described below, the C++ language has certain characteristics which allow a software developer to easily use programs written by others while still providing a great deal of control over the reuse of programs to prevent their destruction or improper use. The C++ language is well-known and many articles and texts are available which describe the language in detail. In addition, C++ compilers are commercially available from several vendors including Borland International, Inc. and Microsoft Corporation. Accordingly, for reasons of clarity, the details of the C++ language and the operation of the C++ compiler will not be discussed further in detail herein.

As will be understood by those skilled in the art, Object-Oriented Programming (OOP) techniques involve the definition, creation, use and destruction of "objects." These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor that uses the corresponding class definition and additional information, such as arguments provided during object creation, to construct the object. Likewise objects are destroyed by a special function called a destructor. Objects may be used by using their data and invoking their functions.

When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code that directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code that performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle that underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these functions appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

Object-oriented technology forms the basis for component technology. For the purpose of this disclosure, components are essentially C++ objects that conform to an object model, such as Microsoft's Component Object Module. An object module is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object modules are useful in contexts where all objects in a given system need to conform to a given protocol governing these parameters. Most object-oriented and object-based languages, including C++, do not specify true object modules, but merely specify syntax and semantics of a basic object implementation without specifying the rules that unify object systems.

The DVD Specification for Read-Only Disc Vol. 3, enables content to accept user input via on-screen buttons. These buttons are typically rectangular areas, although other shapes are possible, such as square, triangle, round, oval, etc., that allow a user to activate a modification or action by clicking the pointing device while overlaying the button. Button activation technology is well known in the art, but where overlapping buttons exist in GUI environments, a solution is presented to the problem of trying to discern and select the desired button with the group of buttons. Since first generation content utilizes non-overlapping buttons, meaning each button is in a unique coordinate position on the screen, selection of these buttons via the pointing device, or mouse, is easy to accomplish. Unfortunately, newer content discs utilize overlapping buttons to create visually appealing menu effects. As has been shown in the prior art history, no known navigator system made logical selection or was able to select any buttons that were overlapping. The method and system being presented provides for correctly processing overlapping button selection via motion-detecting devices such as a mouse. The system and method are capable of processing N buttons that overlap, where N is an arbitrary number. This allows the system to determine correctly the right button to select regardless of the number of overlapping buttons. Further, the system is capable of arbitrating between equally distant overlapping buttons. This can be processed without imposing greater processing overhead for non-overlapping buttons nor does it appreciably increase CPU processing time.

Figure 3:
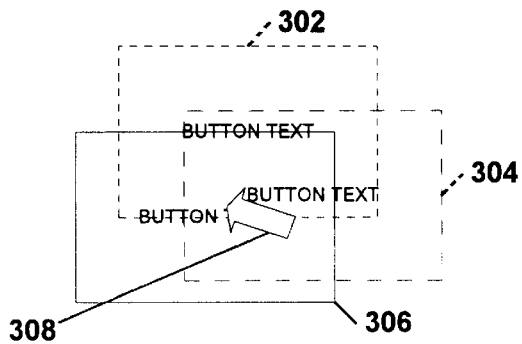
FIG. 3 is a schematic diagram depicting multiple buttons overlapping one another.

FIG. 3 illustrates a situation where multiple buttons overlap. In this example, Buttons 302, 304, and 306 are shown. Each button 302, 304, and 306 has text associated with it to indicate the function or operation of the button, or other information. In this example, the user sees that the cursor 308 is next to the button text for button 306; however, linear processing will cause the first containing button, or button 302, to be selected by the cursor. Thus, from the user's perspective, the wrong button is selected. The solution to this problem is to select the button based on central proximity to the cursor, rather than use the hierarchal ordering currently used in available navigator systems. This is depicted in the flow diagrams described below and illustrated in FIG. 4.

Figure 4:
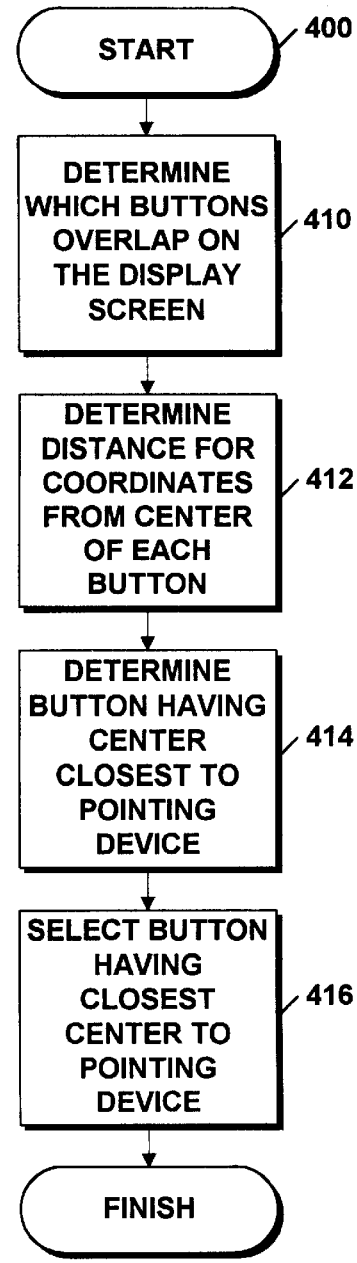
FIG. 4 is a flow diagram illustrating the method for logically selecting the desired button for the user.

FIG. 4 illustrates the process for selecting the most logical button from multiple buttons that overlap. Starting in Step 400, the routine proceeds to step 410, where the system first determines which buttons overlap on the screen. This is done by determine corner coordinates for each button and seeing if any overlaps another's coordinates. Once the system determines all the overlapping buttons, the system, in step 412 determines the distance for the coordinates from the center of each button. Once the last button has been measured, the system proceeds to step 414. In step 414, the system determines which button has the center closest to the pointing device icon. Once the closest center has been determined, the system, in step 416, selects the button having the closest center to the pointing device icon as the button desired by the user. A pseudo-code algorithm is provided below that outlines a given method for actually selecting the overlapping buttons, measuring their distance from center to the pointing icon and then selecting the closest, most logically desired button, based on the center measurement information.

Pseudo-code for overlap existence:

```
loop through each active button which can be selected
    inner loop through each button
    is left, top corner overlapping with button rectangle coordinates [inner loop] or
    is left, bottom corner overlapping with button rectangle coordinates [inner loop] or
    is right, top corner overlapping with button rectangle coordinates [inner loop] or
    is right, top corner overlapping with button rectangle coordinates [inner loop]?
        Yes.
            Set flag indicating overlap is occurring.
            Break out of inner loop
```

Pseudo-code for determining coordinates distance from center of button:

figure out center x coordinate of button figure out center y coordinate

X distance from center=absolute value of (x-center x coordinate)

y distance from center=absolute value of (y-center y coordinate)

return ((x distance from center*x distance from center)+(y distance from center+y distance from center)

Pseudo-code for containing button detection:

```
check flag for overlapping buttons.
    Overlap Exists:
        set distancefromcenter to max value
        while (there's still buttons to search through)
            check if the current button contains the input device's coordinates
            Button contains input coordinates:
                Determine how far the input device is from the center of the
                button in this distance less than distancefromcenter?
```

```
                                            -continued
     Yes.
          Is currently selected button the same distance
          from center? (this arbitrates between
          equidistant buttons
              No.
                  Store this button number
                  Set distancefromcenter to the
                  button's distance
     increment button loop counter
Overlap Doesn't exist:
     Linearly check if there's button which contains the current coordinates
```

Figure 5:
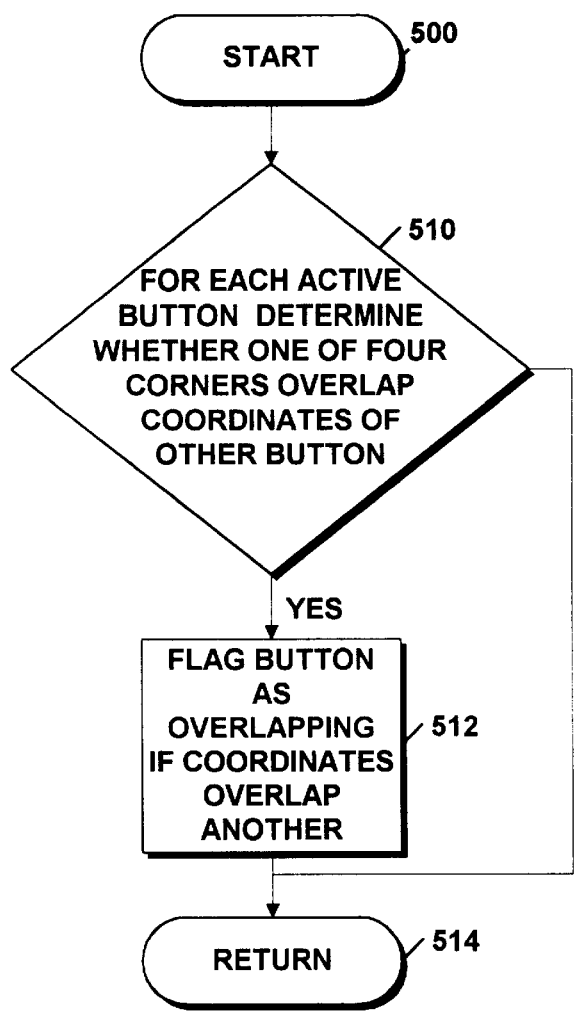
FIG. 5 is a flow diagram illustrating the method for determining which buttons overlap.

FIG. 5 illustrates the method for determining whether a button or icon overlap exists. Starting in step 500, the system proceeds to step 510, where, for each active button that can be selected, the system determines whether any four corners of the rectangular shaped buttons overlap with button rectangle coordinates of any other active button. If any overlap is detected, the button is, in step 512, flagged as being overlapped in order to determine logically whether this button is the desired button selected by the user. Otherwise, if no button is found to overlap, the system returns in step 514.

Figure 6:
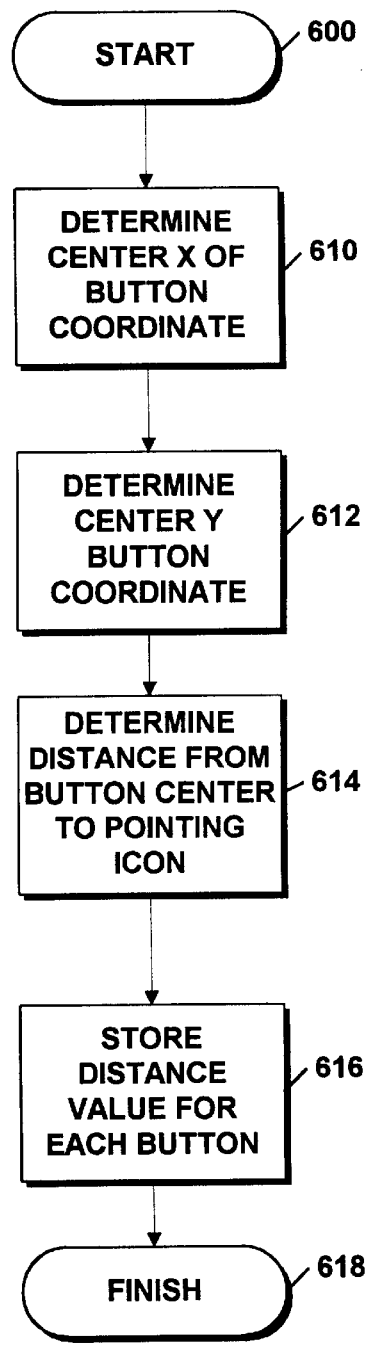
FIG. 6 is a flow diagram illustrating the method for determining the center value for each button in relation to the pointing device icon.

FIG. 6 illustrates the method for determining coordinates distance from the center of each overlapping button determined in FIG. 5 in relation to the pointing device icon. After starting in step 600, the system, in step 610, determines the center x coordinate of button. Then, in step 612, the system determines the center y coordinate of the button. These values are:

x distance from center=absolute value of (x-center x coordinate)

y distance from center=absolute value of (y-center y coordinate)

The system, then in step 614, calculates and returns the actual distance from center to the pointing icon. This is:

((x distance from center*x distance from center)+(y distance from center*y distance from center)

This value is stored in step 616 for each button before returning in step 618.

Figure 7:
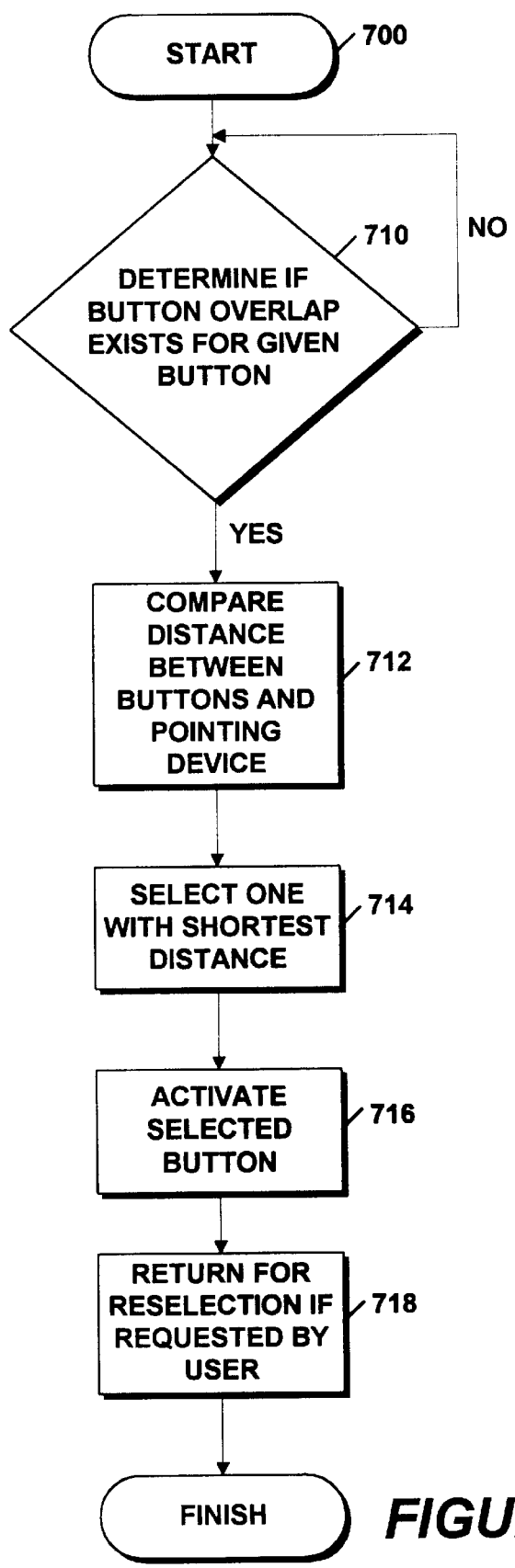
FIG. 7 is a flow diagram illustrating the method utilized to select the logical button based on the center value distances determined by the process of FIG. 6.

FIG. 7 depicts the method in block diagram form used by the system to detect buttons and determine which button is to be selected. First, the system begins in step 700 and proceeds to step 710 where the system determines whether actual overlap exists by checking the flag for that button as determined in FIG. 5. In step 712 the system compares the maximum distance for each button overlapped from the pointing icon. The button having the shortest distance is selected in step 714. Once the logical button is selected, it is activated and processed according to the user's selection in step 716. If the wrong button was selected using the closest center to the pointing device method, the user then backtracks and reselects the desired button in step 718. Once the button is selected and processed, the system awaits for the next button selection to occur by returning to the main program.

The illustrative embodiment of the present invention has been described with reference to an interactive DVD browser written in accordance with the DVD specification for read-only discs. Similar concepts, however, may be applied to any graphical user interface. Graphical user interfaces also rely on users selecting buttons for activation or content modification and this process allows for the proper selection of the desired button where several buttons overlap on the display screen such that it is unclear to the computer or user which button is actually being selected.

The above-described invention may be implemented in either all software, all hardware, or a combination of hardware and software, including program code-based implementations stored in firmware format to support dedicated hardware. A software application suitable for implementing the invention in is the Interactive DVD Browser (IDB), Version 1.0 and thereafter, commercially available from Oak Technology, Inc., Sunnyvale, Calif.

A software implementation of the above described embodiment(s) may comprise a series of computer instructions either fixed on a tangible medium, such as a computer readable media, e.g. diskette 142, CD-ROM 147, ROM 115, or fixed disc 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disc, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate object or processor instructions, or in hybrid implementations which utilize a combination of hardware logic, software logic and/or firmware to achieve the same results, the specific configuration of logic and/or instructions utilized to achieve a particular function, as well as other modifications to the inventive concept are intended to be covered by the appended claims.

What is claimed is:

1. System for selecting a desired icon from multiple icons in a graphical user interface, the system comprising:

a processor;

a memory, coupled to the processor;

a video display, coupled to said processor and the memory, and capable of displaying a graphical user interface;

a pointing device, operatively coupled to said processor and said video display, configured to receive icon selection information through said graphical user interface;

a logical icon selector, coupled to said pointing device and said processor, and configured to determine whether the multiple icons overlap, and when then multiple icons overlap, to measure the center of each of said multiple icons to icon coordinates utilized by said pointing device and to select the icon having the shortest measurement among the multiple icons and, when said multiple icons do not overlap, to select an icon that contains the icon coordinates.

2. The system as recited in claim 1 wherein said logical icon selector determines whether an icon is overlapping another by measuring coordinates of each icon and determining which icons overlap based on icon coordinate information.

3. The system as recited in claim 2 wherein said logical icon selector utilizes the coordinates of each icon to determine a center location of each overlapping icon.

4. The system as recited in claim 1 wherein the logical icon selector determines overlapping icons by identifying at least a portion of the icon that overlaps another icon.

5. In a graphical user interface, a method for selecting a desired icon from a plurality of icons, the method comprising:

(a) monitoring the position of a pointing device icon within the graphical user interface, the pointing device icon representing a pointing device;

(b) receiving icon selection criteria identifying a desired icon from the pointing device;

(c) determining whether any of the plurality of icons overlap;

(d) when any of the plurality of icons overlap, measuring the center of each of the plurality of icons to coordinates used by said pointing device icon and selecting the icon having the shortest measurement among the plurality of icons; and when said multiple icons do not overlap, selecting an icon that contains the icon coordinates.

6. The method as recited in claim 5 further comprising:

(d) determining whether an icon is overlapping another icon by measuring coordinates of each icon and;

(e) determining which icons overlap based on icon coordinate information.

7. The method as recited in claim 6 further comprising the step of:

(f) determining a center location for each overlapping icon.

8. The method as recited in claim 5 further comprising the step of (d) identifying at least a portion of an icon that overlaps another icon using icon coordinates.

9. A computer program product for use with a computer system having a graphics display device that allows a user to logically select a given icon from a plurality of icons, the computer program product comprising a computer usable medium having computer readable program code thereon comprising:

(a) program code for monitoring the position of a pointing device icon within the graphical user interface, the pointing device icon representing a pointing device;

(b) program code for receiving icon selection criteria identifying a desired icon from the pointing device;

(c) program code for determining whether any of the plurality of icons overlap;

(d) program code operable when any of the plurality of icons overlap for measuring the center of each of said plurality of icons to coordinates of an icon utilized by said pointing device and for selecting the icon having the shortest measurement among the icons; and (e) program code operable when said multiple icons do not overlap, for selecting an icon that contains the icon coordinates.

10. The computer program product as recited in claim 9 further comprising:

program code for determining whether an icon is overlapping another by measuring coordinates of each icon;

program code for determining which icons overlap based on icon coordinate information.

11. The computer program product as recited in claim 10 further comprising program code for determining a center location of each overlapping icon.

12. The computer program product as recited in claim 9 further comprising:

program code for identifying at least a portion of the icon that overlaps another icon using icon coordinate information.

* * * * *

UNITED STATES PATENT AND TRADEMARK OFFICE
CERTIFICATE OF CORRECTION

PATENT NO. : 6,181,339 B1
DATED : January 30, 2001
INVENTOR(S) : deCarmo et al.

It is certified that error appears in the above-identified patent and that said Letters Patent is hereby corrected as shown below:

Title page,
Item [*], Notice, delete the phrase "by 0 days" and insert -- by 30 days --

Signed and Sealed this

Twenty-first Day of September, 2004

JON W. DUDAS
*Director of the United States Patent and Trademark Office*